United States Patent [19]

Rodgers et al.

[11] 3,886,311

[45] May 27, 1975

[54] ELECTRICAL WRITING PEN AND SENSOR

[75] Inventors: James L. Rodgers, Tempe, Ariz.; Joseph L. Tyrrell, Torrence, Calif.

[73] Assignee: Talos Systems, Inc., Scottsdale, Ariz.

[22] Filed: Apr. 22, 1974

[21] Appl. No.: 463,154

Related U.S. Application Data

[63] Continuation-in-part of Ser. No. 253,859, May 16, 1972, abandoned.

[52] U.S. Cl. ................................ 178/18; 346/139 C

[51] Int. Cl. ........................ G08c 21/00; H04n 1/00

[58] Field of Search .......................... 178/18, 19, 20; 340/347 AD, 146.3 SY; 73/432 R, 432 A; 346/139 C; 33/1 M

[56] References Cited

UNITED STATES PATENTS

| | | | |
|---|---|---|---|
| 3,182,291 | 5/1965 | Nassimbene | 178/18 |
| 3,440,643 | 4/1969 | Teager | 178/18 |
| 3,528,295 | 6/1970 | Johnson et al. | 178/18 |
| 3,591,718 | 7/1971 | Asano et al. | 178/19 |
| 3,624,293 | 11/1971 | Baxter | 178/18 |
| 3,626,483 | 12/1971 | Whetstone et al. | 178/18 |
| 3,705,956 | 12/1972 | Dertouzos | 178/18 |

*Primary Examiner*—Thomas A. Robinson
*Attorney, Agent, or Firm*—Cahill, Sutton & Thomas

[57] ABSTRACT

A writing pen for detecting time varying electrostatic field components and used in conjunction with a writing table which generates a unique electrostatic field is disclosed.

10 Claims, 6 Drawing Figures

ELECTRICAL WRITING PEN AND SENSOR

This is a continuation-in-part of a U.S. patent application entitled "Electrical Writing Pen and Sensor" filed on May 16, 1972 and assigned Ser. No. 253,859, describing an invention invented by the present applicants and assigned to the present assignee, said application being now abandoned.

The present invention relates to information systems and, more particularly, to sensors for transmitting information related to and coded by the position of the sensor within an electrostatic field.

Various embodiments of hand held writing implements that generate an electrical signal reflective of the position of the implement with respect to a writing surface have been developed. Early embodiments required articulated arms attached to the implement to determine the movement of the implement in the X and Y axis. The pivotal movement of the arms was translated through proportionally variable electrically sensitive means into electrical signals. Recognizing that resolution of the positional information suffered from the mechanical linkage of the arms, various non-mechanically converted writing implements were developed.

Among the later developed writing implements were those employing acoustic elements as the position determining apparatus. U.S. Pat. No. 3,626,483 is representative of such an implement. Optical scanning apparatus have also been used, as illustrated in U.S. Pat. Nos. 3,182,291 and 3,440,643. Pressure responsive transducers have been employed in writing implements to develop an analog wave form reflective of the writer's handwriting, as shown in U.S. Pat. No. 3,528,295. A recent U.S. Pat. No. 3,624,294, teaches an electronic writing pen movable about a surface having an inlaid grid of resistance wires. The writing pen is AD coupled to the gric and provides an output signal representative of the X and Y coordinates of the pen point. Two U.S. Pat. No. 3,530,241 and No. 3,591,718, disclose writing pens utilizing capacitive coupling between a writing table and the writing pen. The former utilizes a wire grid system in the tablet where inputs of a first frequency, but of different phase, are applied to the wires in the Y axis and inputs of a second frequency, but of different phase, are applied to the wires in the X axis. In the latter, the potential field of the writing tablet is alternately switched between vertically and horizontally oriented equipotentials.

In any of the above described writing implements, the signal to noise ratio of the sensing element of the writing pen is extremely important for efficient operation. Therefore, the writing pen must be maintained close to the source of the field generated by the writing tablet. As the picked up signal is of very low power, preamplifier means must be incorporated to boost the sensed signal for transmission to the associated electronic position and information detection circuitry. Aside from the electrical requirements, the writing pen must also provide for a pen cartridge and replacement thereof. An obvious technique for replacing the pen cartridge would be to provide a means for "breaking open" the writing pen to permit axial withdrawal and replacement of the pen cartridge. Such an obvious solution would require that the electrical connectors carrying the signal from the sensing element to the electronic detection circuitry be disconnected during pen cartridge replacement. In view of the conditions under which the pen cartridge is likely to be replaced in the field, any requirement that the electrical connectors temporarily be disconnected or broken produces a high probability of contamination of the connector contacts with a resulting deterioration of the very weak signal output from the sensing element.

Where caparitive coupling is employed, stray capacitance may have a very large effect on the sensed signal and produce an erroneous position and information signal. Further, replacement of the pen cartridge deleteriously and varyingly affects the capacitive coupling unless the writing pen is configured to allow for variation in seating of the pen cartridge without affecting the sensitivity of the sensing element.

It is therefore a primary object of the present invention to provide a writing pen which employs capacitive coupling to detect a specific position within a unique electrostatic field generated by a writing tablet.

Another object of the present invention is to provide a writing tablet having a unique electrostatic field, the components of which identify discrete detectable positions upon the writing tablet.

Yet another object of the present invention is to provide a writing pen essentially immune to stray capacitance.

Still another object of the present invention is to provide a capacitively coupled writing pen having a sensing element which is not affected by parrallax as the angular position of the writing pen is moved about the vertical axis.

A further object of the present invention is to provide a means for restraining use of a writing pen at an angle of greater than 45°.

A yet further object of the present invention is to provide a capacitive coupling between the signal pick up element of a writing pen and an electrical conductor within the writing pen which is not sensitive to limited axial movement of the pick up element.

A still further object of the present invention is to provide a means for replacing the pen cartridge within a writing pen without disturbing the electrical conductors within the writing pen.

These and other objects of the present invention will become more readily apparent to those skilled in the art as the description thereof proceeds.

The present invention may be understood with more specificity and clarity with reference to the following figures, in which.

Figure 2:
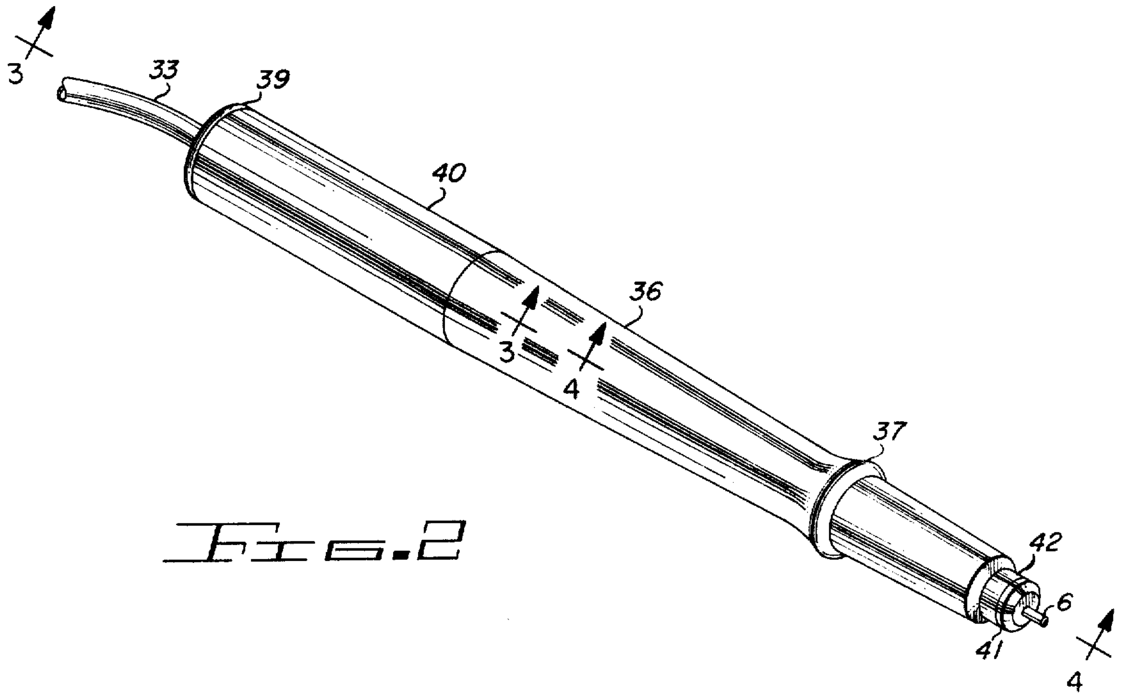
FIG. 2 illustrates the writing pen of the present invention.
Figure 3:
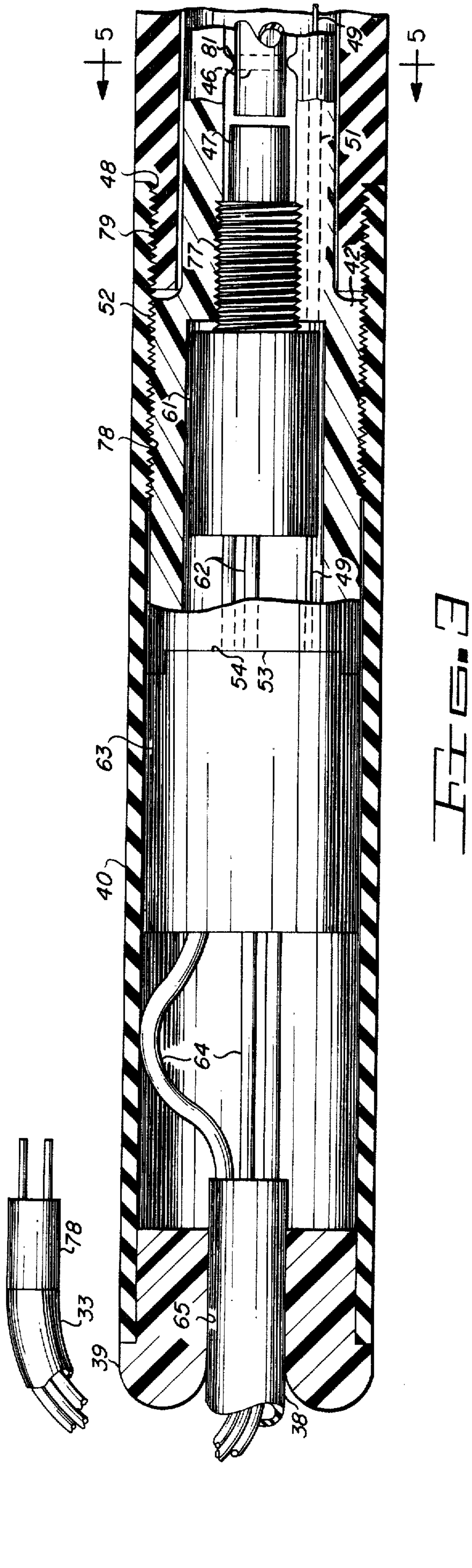
Figure 4:
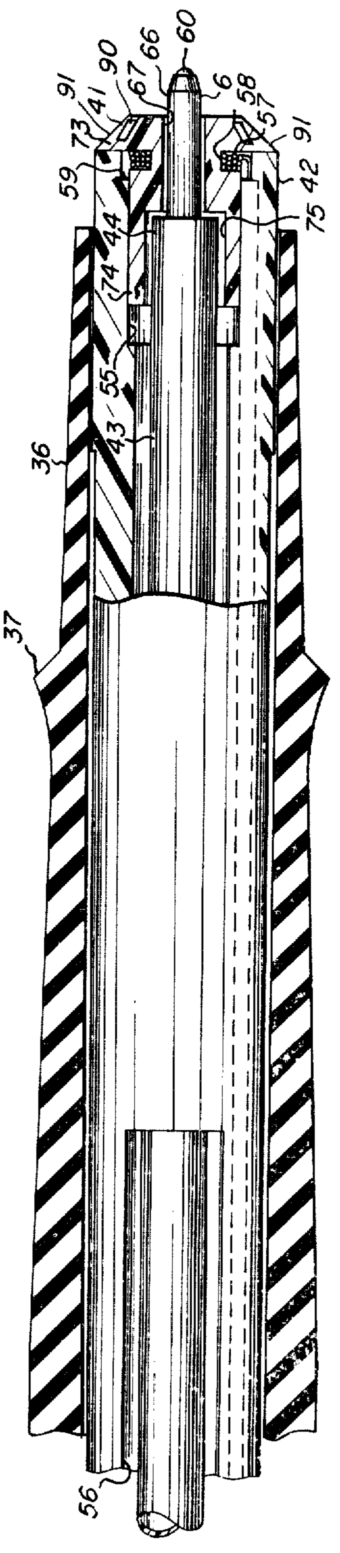

FIGS. 3 and 4, taken together, illustrate sectional views of the writing pen, taken along lines 3—3 and 4—4, as shown in FIG. 2.

Figures 5, 6:
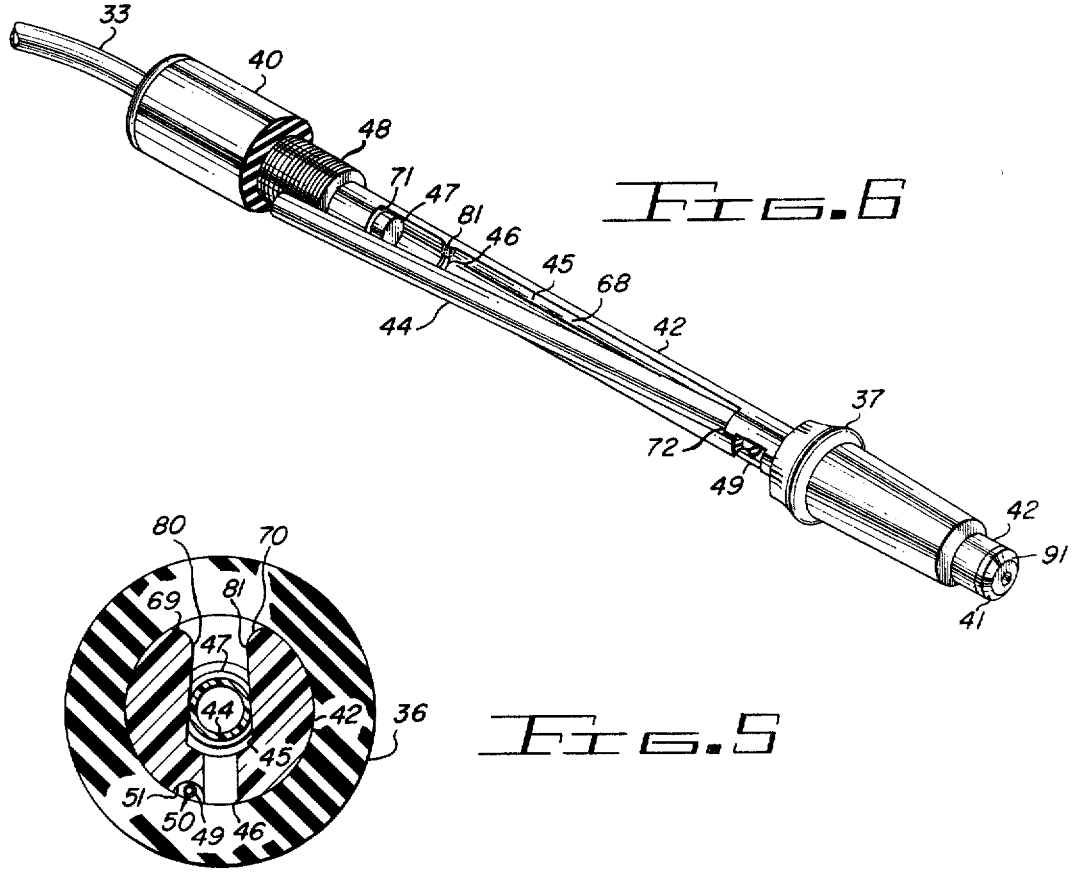

FIG. 5 illustrates a cross-section of the writing pen 8 taken along lines 5—5, as shown in FIG. 3.

FIG. 6 depicts the breech loading of the pen cartridge within the writing pen.

Figure 1:
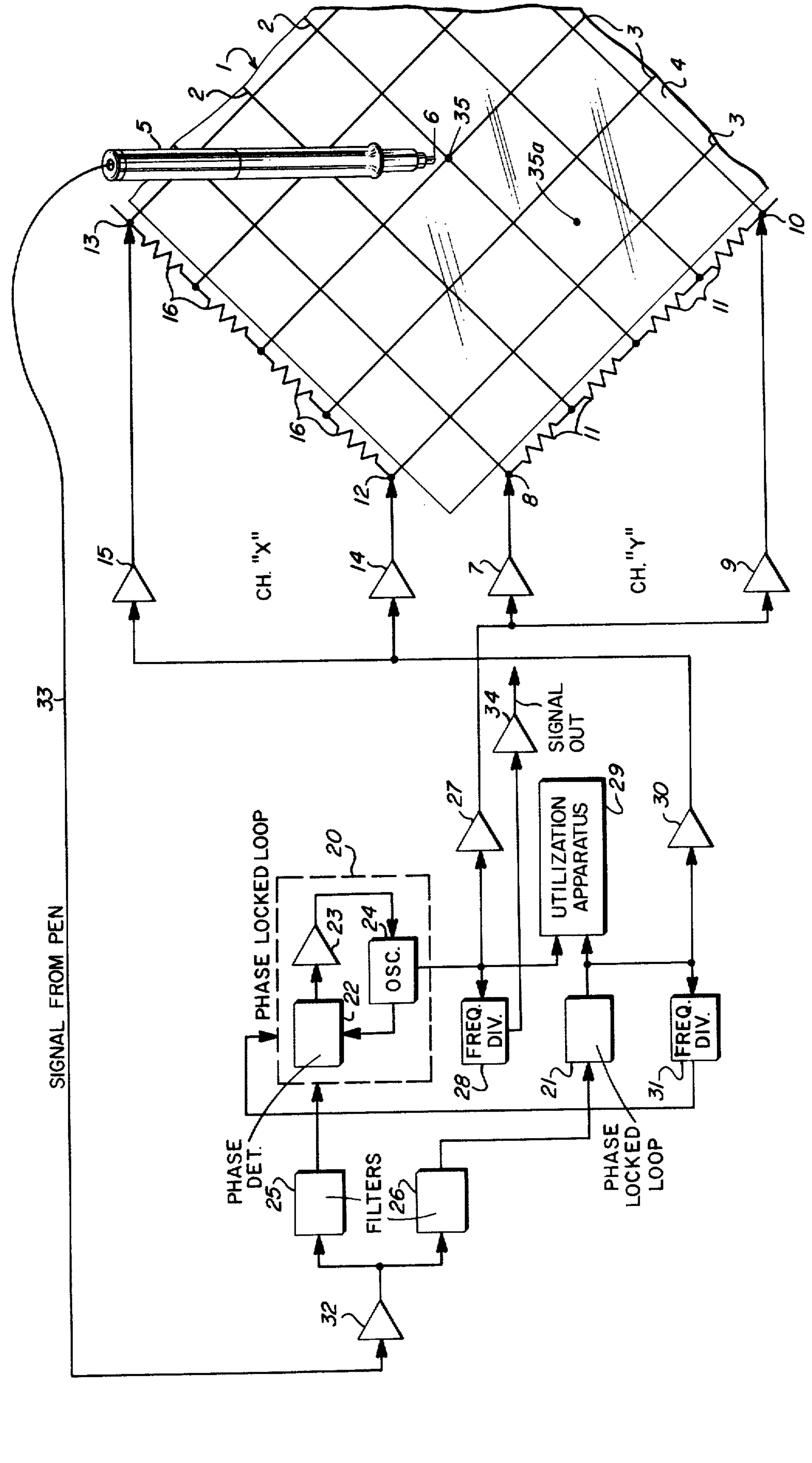
FIG. 1 illustrates the information transmission system of the present invention.

The environment of the present invention is shown in FIG. 1. The writing table 1 is formed by a grid having a first set of parallel "Y" wires 2 and a second set of parallel "X" wires 3 disposed orthogonal to one another. It will be understood that wires 2 and 3 do not touch one another where they cross inasmuch as they are slightly and uniformly separated in the third dimension. Thus wires 2 fall into a plane parallel to but slightly displaced from a plane containing wires 3. A thin, rigid writing surface 4 overlays the grid. Writing surface 4 is used to support writing material such as blank, lined, graph, or other paper upon which a special writing pen 5 may be used. Pen point 6 of pen 5 functions in the manner of the usual ballpoint pen.

A channel Y lag driver 7 feeds one end of a resistive network connected to the Y wires at electrical point 8, and a channel Y lead driver 9 feeds the other end of the resistive network at electrical point 10. The resistive network is formed by a plurality of resistors 11 with each of the Y wires 2 connected to the junction of adjacent ones of resistors 11. Similarly, electrical points 12 and 13 at the two ends of a resistive network connected to X wires 3 are driven, respectively, by a channel X lag driver 14 and a channel X lead driver 15. The individual X wires 3 are each connected to the junction of adjacent ones of a plurality of resistors 16.

A fundamental constituent of each channel is a phase locked loop. The channel Y phase locked loop 20 and the channel X phase locked loop 21 are basically the same although they operate at substantially different center frequencies. Thus, referring in particular to the channel Y phase locked loop 20, it will be noted that the elements therewithin include a phase detector 22 driving an amplifier and filter element 23 which, in turn, drives a voltage controlled oscillator 24. Oscillator 24 provides both a feedback signal to the phase detector 22 and an output signal. Those skilled in the art will recognize this as a classical phase locked loop configuration.

The output signal from the voltage controlled oscillator 24 is impressed as the input to a wave shaping amplifier 27. The output of amplifier 27 is coupled to the channel Y lag driver 7 and the channel Y lead driver 9. Additionally, the output signal from the voltage controlled oscillator 24 is applied to a frequency divider 28 and also as one input to generalized utilization apparatus 29. Similarly, the channel X phase locked loop 21 has an output signal impressed on a wave shaping amplifier 30. The output of amplifier 30 is coupled to the channel X lag driver 14, the channel X lead driver 15, the second input to the generalized utilization apparatus 29 and to a frequency divider 31.

The pen point 6 of the special writing pen 5 functions as a pickup element to detect the electrostatic field components generated by the X and Y wires. The pen point 6 may be of metal or otherwise of electrically conductive material. In the alternative, it may include an axially aligned electrically conductive pick up element. The signal picked up by the pen point 6 is coupled to the input of amplifier 32 by a conductor 33. The output from the amplifier 32 is impressed on the input terminals of bandpass filters 25 and 26 which feed, respectively, the channel Y phase locked loop 20 and the channel X phase locked loop 21. The pass bands of the filters 25 and 26 are selected to pass signals in the frequency range across which the respective voltage controlled oscillators of the phase locked loops 20 and 21 function. Thereby, the filters electrically separate the electrostatic field components generated by the X and Y wires and provide a means for determining the by the X and Y wires and provide a means for determining the position of pen point 6 on writing tablet 1.

The output signal from frequency divider 31 is a signal at, for example, one-sixteenth the frequency issued from the voltage controlled oscillator of the channel X phase locked loop. This signal is impressed as a third input to the phase detector 22 of the channel Y phase locked loop in order to frequency-modulate the channel Y information with channel X information. The output signal from the frequency divider 28, which will be a fourth sub-harmonic of the signal issued by the voltage controlled oscillator 24, contains both channel Y and channel X information and is conditioned by the amplifier 34 to provide an output signal capable of being interfaced with ordinary telephone lines.

The operation of a phase locked loop is well documented in the literature and therefore need be discussed only briefly to provide an understanding of its utilization as a circuit element in the environment of the present invention. Referring to the channel Y phase locked loop 20, the center frequency of the voltage controlled oscillator 24 may be selected by utilizing timing components having values in accordance with the desired center frequency. If the d-c voltage issuing the amplifier and filter 23 is at a predetermined level, then the voltage controlled oscillator 24 will operate at its nominal frequency. However, if the d-c voltage issued from the amplifier and filter 23 deviates in either direction from this predetermined value, the frequency of voltage controlled oscillator 24 shifts as a linear function of the voltage change.

The amplifier and filter 23 issues a d-c voltage in accordance with the signal it receives from phase detector 22, and the signal issued by the phase detector 22 is directly related to the difference in phase, if any, between the reference signal received from the voltage controlled oscillator 24 and the input signal received from the bandpass filter 25. If any phase difference exists, the voltage controlled oscillator reacts by shifting its frequency of operation to bring the input signals back into phase. Because of the complexity of phase locked loop circuitry, the use of integrated circuits such as the type LM 565 manufactured by National Semiconductor Corporation are preferred at present.

It will be observed that an output signal from the voltage controlled oscillator 24 is impressed as an input on wave shaping amplifier 27 which, in a presently preferred embodiment of the invention, issues a triangular waveform to the channel Y lag driver 7 and channel Y lead driver 9. The channel Y lag driver 7 serves to shift the phase of the input signal thereto a predetermined amount, such as 45°, in the lag direction. Similarly, the channel Y lead driver shifts the signal ahead through an identical angle such that the signal appearing at electrical point 10 may be identical in frequency and waveform to that appearing at electrical point 8 with a total phase shift between electrical points 8 and 10 being 90°. Resistors 11 serve to spread this phase shift equally (or in some other predetermined distribution) between electrical points 8 and 10 such that the time varying voltages applied to Y wires 2 at junctions of the resistors 11 each have a unique phase relationship to the signal issued by the voltage controlled oscillator 24.

Correspondingly, a signal from the voltage controlled oscillator (not shown) of the channel X phase locked loop 21 is passed through wave shaping amplifier 30 and through channel X lead driver 15 and channel X lag driver 14 to excite electrical points 13 and 12, respectively, with signals identical in frequency and waveform but offset from one another by 90°. The phase difference is distributed to X wires 3 by means of resistors 16 such that the time varying voltage applied to each of X wires 3 has a unique phase relationship to the signal issued from the channel X phase locked loop 21. In accordance with the well known laws of electrostatics, a field will be generated about each of X wires 2 and Y wires 3, and the signal picked up by pen point 6 of pen 5 will be an instantaneous summation of the fields generated by all X wires 2 and Y wires 3 according to their amplitudes at the position of the pen point.

In further explanation of the resistor divider network for obtaining a phase shift between each of the X or Y axis oriented wires, the following summary is offered. If a +45° phase shifted signal is applied at one end of a resistor divider and another −45° phase shifted signal is applied to the opposite end of the resistor divider, the net result will be an algebraic summation of the signals at any point along the resistor divider. The algebraic summation at the centerpoint will provide a signal having a zero phase shit and an amplitude of a finite value dictated by the algebraic sum of the amplitudes. However, if the signals applied to the divider network are phase shifted +90° and −90°, then the algebraic summation at the mid point of the resistor divider would produce a signal with zero phase shift and zero amplitude.

In a modification of the present invention, a signal of significient amplitude but of zero phase shift is injected at the midpoint in conjunction with a 90° leading and 90° lagging signal injected at the extremities of the resistor divider. This produces a signal at the centerpoint which has a zero phase shift but a significant amplitude.

As a corollary to the above, the phase shift and amplitude of a signal at any point along the resistor divider will be the algebraic sum of the phase shifted applied signals. The algebraic sum will be reflective of and proportional to the relative resistance between the test point and each of the ends of the divider network. Thereby, the signal at the junction of any two resistors will have a unique phase shift and amplitude different from a signal at any other resistor junction.

In order to segregate the X and Y position information, it is necessary that the X and Y voltage controlled oscillators in the corresponding phase locked loops 21 and 20 function in well separated frequency bands. For example, the center frequency of the channel Y voltage controlled oscillator 24 is 7 khz, and that of the corresponding voltage controlled oscillator in the channel X phase locked loop 21 is 1,440 hz. Correspondingly, the bandpass filters 25 and 26 are centered at 7 khz and 1,440 hz, respectively.

Consider now a condition in which the pen point 6 is situated at physical point 35 on the writing table 1. It will be noted that the physical point 35 lies just above an intersection at the center of Y wires 2 and X wires 3. As a result, the electrostatic signal picked up by pen point 6 includes an X coordinate component having an equal input signal contribution from lag to lead drivers 14 and 15 and a Y coordinate component having an equal input signal contribution from lag and lead drivers 7 and 9. Therefore, each component picked up by the pen point 6 exhibits a zero phase shift and the algebraic sum of the components will have a zero phase shift, such that the total phase shift of the composite signal will be zero. The composite signal from the pen, amplified through the amplifier 32, is separated into the X and Y components by the bandpass filters 26 and 25, respectively. The Y component is impressed on the phase detector 22 of the channel Y phase locked loop 20, and the phase detector, in comparing the phases of this signal and the reference signal received from the voltage controlled oscillator 24, observes a zero phase difference such that the voltage controlled oscillator 24 continues to function at 7 khz. Similarly, the phase detector (not shown) of the channel X phase locked loop 23 will also observe a zero phase difference, and the output frequency from the channel X phase locked loop will therefore remain at 1,440 hz.

Suppose, however, that the pen point 6 is situated at physical point 35a on the writing table 1. In that event, with respect to the Y component of the signal picked up by the pen point 6, the phase thereof will lead the signal applied to the drivers 7 and 9 by an angle determined by the resistors 11. The phase detector 22 responds to this sensed phase difference by applying an error signal to the voltage controlled oscillator 24 to bring about an increase in frequency sufficient to stabilize the channel Y phase locked loop to zero phase shift. However, at physical point 35a, the X component of the field sensed by the pen point 6 lags that input signal to the drivers 14 and 15 such that the channel X voltage controlled oscillator (not shown) will shift to a lower frequency to restore the zero phase shift condition naturally sought by the channel X phase locked loop 21.

Thus, it will readily be observed that the output frequencies from the channel Y phase locked loop 20 and the channel X phase locked loop 21 provide an instantaneous two dimensional indication of the exact position of the pen point 6 on the writing table 1. This two channel frequency information may be applied separately to the generalized utilization apparatus 29 which may consist of any conversion apparatus, storage apparatus, or data transmission apparatus capable of handling such information. Exemplary apparatus capable of performing such functions are well known in the art and need not be considered at length here since the utilization apparatus is outside the scope of the present invention. Merely by way of example, utilization apparatus 29 might typically consist of a remote two dimensional plotter, an analog-digital converter comprising an input to a digital computer or a digital storage device, a two-channel wireless or wire transmitter, or the like.

The environment of the present invention finds a highly advantageous application in coupling the pen position information to remote apparatus over a single channel such as a conventional telephone circuit. In order to carry out this specific function, the channel X and channel Y information is combined into a frequency-modulated signal with a shifting carrier frequency. The output signal from the channel X phase locked loop 21 is passed through frequency divider 31 which performs a frequency division of 16. Therefore, the output signal from the frequency divider 31 will be frequency-modulated about a center frequency of 90 hz. This channel X frequency divided information is applied as a separate input to the channel Y phase detector 22 and thus serves to frequency-modulate the instantaneous channel Y frequency. With this arrangement, the frequency at which the channel Y voltage controlled oscillator 24 functions is slightly affected by the channel X information, but the effect, insofar as channel Y operation of the writing table 1 is concerned, is inconsequential because the modulating frequency is well below the passband of the bandpass filter 25.

The output signal from the channel Y voltage controlled oscillator 24 therefore has an instantaneous frequency primarily determined by the position of the pen point 6 in the Y direction with a further frequency component attributable to the X position of the pen point 6. The output signal from the channel Y phase locked loop 20 centered about 7 khz is passed through a frequency divider 28 which is in a useable portion of the conventional telephone circuit bandwidth. As the pen 5 is manipulated on the writing table 1, the instantaneous frequency of the signal issued by the amplifier 34 will vary about 1,750 hz in accordance with the instantaneous X and Y position information. By utilizing tracking filters, that portion of the telephone quality circuit bandpass not utilizing, instantaneously, the pen position information may be allocated to voice transmission.

The combined pen position and voice information may be separated and recovered at a remote location by a similar tracking filter. The pen position information may then be passed through a channel Y phase locked loop substantially identical to the element 20 to extract a signal related to the instantaneous frequency for driving a channel Y reproducing pen servo. The channel X information is separated from the channel Y information by simply utilizing a bandpass filter, the output of which is applied to a channel X phase locked loop which issues a signal driving a channel X reproducing pen servo. Such two-dimensional servos are well known in the art and typically include feedback means, such as a potentiometer, to provide an indication to the reproducing phase locked loops of the instantaneous position of the reproducing pen.

Certain simplifications have been made in the above description to achieve clarity. For example, some phase shift may take place through the circuitry and, inasmuch as this source of phase shift remains constant, it may be suitably compensated during an initial adjustment procedure. Additionally, it will be understood that one, two and three dimensional equivalents to the writing table may be substituted and the position of an antenna element corresponding to the writing pen may be determined by providing one, two or three channels operating at sufficiently diverse frequencies. Further, it will be recognized that the resistors 11 and 16 may not have uniform values nor is it necessarily desirable for the wires 2 and 3 to be uniformly spread. Indeed, it has been found necessary, in order to achieve linearity, to provide resistors 11 and 16 varying somewhat in value from the ones near the center of the grid to the ones near the electrical feed points. Alternatively, the distance between adjacent wires in each plane of the grid may be adjusted to achieve linearity. As a practical matter, a combination of both methods may be utilized. By the same means, characteristics other than linear (such as logarithmic) can be accorded the writing area by appropriately selecting the values of each of the resistors in the groups 11 and 16 as well as the spacing between the wires comprising the grid. The number of wires 2 and 3 and resistors 11 and 16 in each plane is, of course, typically much greater than that shown in FIG. 1.

FIG. 2 illustrates the writing pen 5 used in the present information transmission system. The outer portion of writing pen 5 includes two major sections: a shield 36 and body 40. The shield 36 includes a finger guard 37 acting as a positioning device for the finger tips of the writer's hand. Finger guard 37 also serves two important purposes with respect to the operation of the present invention. The writing surface of the writing table 1 (see FIG. 1) preferably lies within a depression in the cabinet (not shown) housing the apparatus. In order to permit the writing pen 5 to be utilized across the whole surface of the writing paper, including the surface adjacent the walls of the depression, it is necessary that the fingers of the writer's hand not restrict such movement. The finger guard 37 accomplishes this purpose by raising the writer's finger above the writing surface to a height approximately equivalent to the depth of the depression mentioned above. If the design of the cabinet housing the present information transmission system permits the paper and the writing table 1 to be in approximately the same plane as the top of the cabinet, the position of the finger guard 37 may be closer to pen point 6 to permit the writer to hold pen 5 in a grip approximately equivalent to that of holding a normal pen. As will be described in detail below, stray capacitance is to be avoided, particularly, in proximity to pen point 6. By restricting the writer's hand to a point axially removed from pen point 6, the effect of any stray capacitance from the writer's hand is avoided.

The previously discussed pen point 6 extends from shield 36 through the extremity of cartridge housing 42 and is secured to the latter by nose 41. A cap 39, positioned at the rear extremity of body 40, includes an aperture 65 (see FIG. 3) through which cord 33 extends. As discussed previously, cord 33 conveys the signal picked up by pen 5 to the information conversion system, shown in FIG. 1.

The internal constructional features of pen 5 are explicitly shown in FIGS. 4 and 5. In order to most clearly set forth the constructional features of pen 5 and their operational interdependence, the description will trace the path of the signal picked up at the pen point 6 to the signal transmitted through the cord 33.

There are two basic operational features of pen 5, vis a vis, the visual recording upon writing paper of the information being written; and the operation of generating an electric signal representative of the information being written.

For the sake of simplicity, the constructional features performing the operation of visible written information will be discussed first. The pen point 6 is generally similar to the commoly known ballpoint pens; however, there are certain subtle but important differences. Pen Point 6 includes a sintered carbide ball 60. The selection of the material for ball 60 is predicated upon the requirements for "non-skip" performance. The ball 60 is secured within barrel 66 by conventional and well known means. Barrel 66 is slidably secured within aperture 67 of nose 41 and extends into the internal portion of pen 5. A ballpoint pen cartridge 44 is attached to barrel 66 by conventional means and includes an ink supply 43. The ink must be non-conductive, either while wet or dry to avoid providing an undesirable electrical interference with the signal picked up and carried by pen point 6. The cartridge 44 lies within a cavity 45 of cartridge housing 42, as more clearly illustrated in FIG. 6.

The cavity 45 serves two distinct purposes. First, it acts as a supporting member to position and seat the cartridge 44. Second, it provides a means through which the cartridge 44 and attached pen point 6 is replaced within pen 5 without disconnecting any of the electrical conductors within the pen.

Referring again to FIGS. 3, 4 and 5, the cavity 45, extending concentric with pen 5 for a distance at least as great as the length of cartridge 44, has an opening 68 defined by edges 69, 70, 71 and 72. The length of edges 69 and 70 is less than the length of cartridge 44 and edges 71 and 72 are equal to the width of cavity 45. The manner of loading pen 5 with cartridge 44 and attached pen point 6 is commonly referred to as breech loading. That is, the pen point 6 is inserted into the cavity 45 adjacent edge 72. The remainder of cartridge 44 is then pushed toward the nose 41 of pen 5 until pen point 6 slides through cavity 67 and protrudes through nose 41. At this point, the rear of cartridge 44 has clared edge 71 and the full length of the cartridge may be pushed into cavity 45.

To remove an empty cartridge and attached pen point, the pen point 6 of a fresh cartridge, a thin rod, or similar object is inserted through aperture 46 of cartridge housing 42 to force the rear of cartridge 44 out of cavity 45. Cartridge 44 may then be grasped and withdrawn rearwardly from the forward portion of cavity 45. Side protrustions 80 and 81, disposed coincident with apperture 46 on the wall of cavity 45, provide a slight interference fit only during insertion and removal of cartridge 44 within cavity 45 and do not preclude or inhibit axial displacement of the cartridge when positioned within the cavity.

As discussed above with reference to FIG. 1, each of the Y and X wires, 2 and 3, respectively, establishes an electrostatic field when energized. The field established varies from point to point across writing table 1 such that any given point on writing table 1 has a unique electrostatic field address. It is the function and purpose of pen 5 to not only display visible written information but also to detect and transmit the electrostatic address of each of the points traversed in writing the information. The unique addresses obtained thereby are transmitted through cord 33 to the electronic apparatus and converted into useable signals.

Referring particularly to FIGS. 3 and 4, nose 41 is a plug-like apparatus serving a plurality of functions. Aperture 67, extending through the central part of the nose 41, provides lateral support for pen point 6. An annular flange 73 extending about the front part of the nose 41 abuts the end of cartridge housing 42 and limits the displacement of nose 41 within cartridge housing 42. Adjacent flange 73 and concentric with aperture 67 is an annular cavity 58. Extending rearwardly from cavity 58 is a circular skirt 74. Skirt 74 is intended to fit adjacent the surface of annular recess 55 within cartridge housing 42 to securely axially position nose 41 with respect to cartridge housing 42 and to insure that pen point 6 is at the approximate axis of writing pen 5. A central cavity 75 within skirt 74 receives cartridge 44.

A coil 57 disposed within cavity 58, is capacitively coupled to pen point 6 to sense eliminate transmit a signal representative of the signal picked up by the pen point when the latter is within the electrostatic field produced by writing table 1. The capacitive coupling between traverses 57 and pen point 6 provides several advantages; the pen point may be replaced without physically affecting the integrity of the electrical connection between the coil and the electrical transmission elements within the writing pen; static and noise caused by actual writing operations are eliminated as is noise which might be generated by movement of the pen cartridge; and, the coil acts as a high pass filter to eliminant low frequency noise, direct current components, and minimizes any trailing antenna effect of the drying ink. In this manner, the pen point 6 when writing on the writing table 1, transverses the varying electrostatic field across writing table 1 and picks up a signal in responsive thereto, which signal is capacitively sensed by coil 57. As the pen point 6 is the component closest to the source of the electrostatic field, a minimum of parralax occurs as the pen 5 is varied in angular position.

The signal capacitively coupled to coil 57, is conveyed by a conductor 49 to a preamplifier 63 disposed at the rear of the pen housing which raises the amplitude of the signal for transmission to the amplifier 32 (FIG. 1) through cord 33. It may be observed, because of the modest electronic requirements of the system, that the frequency response characteristics of the preamplifier 63 can be quite modest and correspondingly simple. A bandpass of 1 khz-9 khz has been found to be entirely adequate and easily achieved. To preserve the integrity of the signal carried by conductor 49, the conductor 49 may be wrapped with insulation 50 (see FIG. 5) to prevent direct electrical contact between the antenna and any adjacent electrically conductive elements. Conductor 49 is placed within a recess 51, which recess is disposed within the periphery of cartridge housing 42 and extending the full length thereof. The material from which cartridge housing 42 is manufactured is preferably plastic and therefore electrically non-conducting. In addition, the cartridge 44 extending parallel to conductor 49 is plastic with non-conducting ink 43 disposed therein. As each of these elements is non-conducting and incapable of generating an electrical signal in and of itself, it is unlikely that they will subject conductor 49 to any electrical noise or induse any stray capacitance.

The shield 36, encircling the conductor 49, ink 43 and housing 42, is metallic. The insulation surrounding conductor 49 within recess 51 prevents electrical contact between conductor 49 and shield 36. Shield 36 encasing the conductor 49 serves as an electrical chield to prevent the instrusion of radiated electrical signals in proximity to conductor 49 and thereby serves to preserve the signal-to-noise ratio of the signal sensed by coil 57 and fed into conductor 49.

To further minimize the intrusion of stray capacitance upon either pen point 6 or coil 57, a truncated hollow conical shaped metallic shield 90 may be formed within nose 41 about cavity 67. This shield will also preclude the transmission of the electrostatic field through nose 41 which electrostatic field may be generated at a point not in the immediate proximity of ball 60 of pen point 6.

For simplicity of operation and maximum utilization of automated mechanisms, it is desirable that writing pen 5 be electrically inactive when not in use. There are, of course, several means by which such a result can be accomplished. The means for activating writing pen 5 in the present invention serves two purposes. First, it requires no effort on the part of the user. Such a result is desired as the typical user of the present invention is a person who simply wished to instantly communicate with another party through the medium of a written message or drawing. Such a person may or may not have any understanding of technical matters. Further, he may be awed by any requirements for switching, activation, or deactivation of the apparatus. Thus, the activation and deactivation of the writing pen 5 of the present invention must be automatically performed when the user is ready to write. Second, the activation and deactivation must be effected by a minimum parts count whereby the meantime between failure (MTBF) can be maintaned as high as the MTBF of the other components of the present invention. For these reasons, the following described apparatus activates and deactivates writing pen 5.

A pushbutton minature switch 61, located within body 40, provides an indication of whether or not the pen is being used to convey information. Switch 61, threaded into cartridge housing 42 via threads 77, secures switch 61 to the cartridge housing and positions the pushbutton 47 in axial alignment with the end of cartridge 44. The axial positioning of pushbutton 47 with respect to cartridge 44 is configured to allow only sufficient axial freedom therebetween to permit cartridge 44 to be inserted and removed from the cartridge housing 42.

Ballpoint pens of a general type and of the type used in the present invention require between 8 to 12 grams of pressure to rotate ball 60 and apply ink to the writing surface. To conform with and to meet the requirements previously enumerated of automatic activation of the writing pen when the user begins to mark, the pressure required to actuate switch 61 is preset to be 10 grams. As a matter of general practice, most persons using ballpoint pens exert a force much greater than ten grams when writing. Therefore, with the ten gram requirement for actuating switch 61, it can safely be assumed that at any time that a writer would use the writing pen 5, the switch 61 would be actuated. The switch 61 used in the present invention is a normally closed single pole, single throw type of switch.

Amplifier 63 is physically locked to a key 53 disposed at the extremity of cartridge housing 42 by keyed surface 54 of amplifier 63. Two leads 62 extend from amplifier 63 to switch 61. On actuation of pushbutton 47, the leads 62 are open circuited and a signal representing contact between the pen 5 and writing table 1 is conveyed to the circuitry associated with the writing table. The conductor 49 from coil 57 within the nose 41 extends within channel 51 of cartridge housing 42 past switch 61 and to one of the electrical connections of amplifier 63. The input signal transmitted along conductor 49 is operated upon by amplifier 63, and the resulting signal is transmitted from the amplifier 63 through leads 64. Leads 64 are shielded by shield 38 disposed within the central aperture 65 in cap 39. The shield 38, and leads 64, comprise the connecting cord 33 (see FIG. 1) between the writing pen 5 and the main electronic portion of the system. For convenience, a plug, such as plug 78, may be used to electrically connect writing pen 5 with the main electronic circuitry associated with writing table 1.

As discussed previously, the maintenance of as high a signal-to-noise ratio as possible is preserved to the greatest extent by employing no electrical disconnects within the electrical path of the sensed but not amplified signal. Further, shield 90 and shield 36 tend to electrically isolate coil 57 and conductor 49, respectively, against stray capacitance and thereby preserve the electrical integrity of the transmitted signal. The amplifier 63 amplifying a signal transmitted along conductor 49 increases the signal-to-noise ratio as well as increasing the level of the signal itself. The shield 38 is an electrical shield which serves to preserve the signal-to-noise ratio of the amplified signal carried by leads 64. In this manner, shield 38 electrically insulates the signal from disturbing outside electrical radiation.

As stated above, the main body of writing pen 5 includes two housing members, body 40 and shield 36. Cap 39 and amplifier 63 are physically secured within body 40 to prevent their movement therein. The end of cartridge housing 42, which includes the switch 61, has a plurality of threads 52 extending about its periphery. These threads 52 co-operate with threads 78 disposed about the internal surface of body 40 and thereby permit the threading of cartridge housing 42 into body 40. The positioning of cartridge housing 42 within body 40 secures the positional relationship between amplifier 63 and cartridge housing 42 and establishes physical rigidity to prevent displacement therebetween during normal use. Further, body 40 need not be removed during replacement of cartridge 44. Thus, body isolates the enclosed components from tampering and contamination during normal in field operation.

The threads 52 of cartridge housing 42 extend for a lesser axial distance than threads 78 of body 40 resulting in a plurality of overlapping threads 79 about the internal surface of body 40. Shield 36 includes a plurality of threads 48 disposed about the periphery of one end. These threads 48 functionally cooperate with threads 79 whereby shield 36 is threadedly secured to body 40. With this arrangement, facile assembly and disassembly between shield 36 and body 40 is accomplished by simply unscrewing shield 36 from body 40 and sliding shield 36 along cartridge housing 42. As may be deduced from the previous discussion of the replacement of cartridge 44, the shield 36 is removed when it becomes necessary to replace the cartridge.

The above-described means for dismantling the writing pen 5 was predicated on one primary factor — the maintenance of a high signal-to-noise ratio of the signal sensed by coil 57 and carried by conductor 49. Thus, any interruption of the electrical path from coil 57 to amplifier 63 is undesirable as such interruptions might generate poor electrical connections with unacceptable attendant results. In the described embodiment, there is no interruption of the electrical path, and the electrical continuity of the signal is therefore preserved. There is, of course, interruption of the signal radiation from pen point 6 to coil 57 when the pen point is removed. However, as the capacitive coupling therebetween does not entail physical electrical connection, no electrical contamination therebetween will result. When a new pen point and cartridge is inserted, cavity 67 insures that the pen point will be in a sufficiently close axial and radial position to re-establish capacitive coupling.

Certain aspects of the physical configuration of the pen 5 described above provide advantages that are not immediately apparent. For example, the breech loading approach toward the replacement of a writing element completely physically separate from coil 57 not only permits replacement of a writing element without altering the characteristics of the interface between the pen point 6 and the coil, but does so in an embodiment which may be subjected to considerable abuse, such as may be expected in the environment contemplated, without failure or even degradation of function. Similarly, the finger guard 37 almost completely eliminates the fingers of a user, which may be contaminated by perspiration or otherwise, from touching the writing surface which could conceivably slightly alter the electrostatic field which would result in slight inaccuracies of reproduction.

The relationship between the position of ball 60 and the slanted radial face 91 of the nose 41 is specifically configured to limit the angle at whcih the pen can be held while making a mark upon the writing tablet. If no mark is made, the operator will tend to "straighten" the pen to continue writing. Thus, the lateral force exerted upon the cavity 67 and nose 41, and resulting friction which might preclude axial movement of cartridge 44 to energize switch 61, is automatically regulated.

It may also be pointed out that as coil 57 is capacitively coupled to pen point 6 axial sliding movement of the pen point has no affect on the degree of coupling, hence signal strength, provided that the pen point is radially coincident with the coil. Therefore, the exact axial position of the cartridge 44 and pen point 6 is not critical and need only meet the requirements of pushbutton 47.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

We claim:

1. An information transmission system including a writing instrument for detecting the information to be transmitted and a writing table with associated electronic circuitry having positions represented by time varying electrostatic field components, said writing instrument comprising, in combination:

a. a pen cartridge containing ink and including a pen point at one end thereof for transferring said ink to a writing surface for effecting a visual record of the path of said pen point;

b. a pen cartridge housing having a longitudinally extending cavity for receiving and supporting said pen cartridge in said housing with said pen point extending from said housing;

c. an electrostatic field pick up element forming a part of said pen point for detecting and re-radiating said electrostatic field components in proximity to the point of contact between said pen point and said writing table;

d. an electrostatic field sensing element secured in said housing adjacent said pen point of said pen cartridge for detecting said electrostatic field components radiated by said pick up element and issuing an output signal in response thereto;

e. signal amplifying means secured to said pen cartridge housing at an end remote from said pen point;

f. electrical conducting means extending uninterrupted substantially the length of said housing and connected to said field sensing element and to said signal amplifying means; and g. means defining an opening in said cartridge housing extending longitudinally thereof and communicating with said cavity to permit said pen cartridge to be removed and replaced without disconnecting said electrical conducting means.

2. The system as set forth in claim 1, wherein said electrostatic field sensing element comprises a coil, said coil being axially aligned with said pen cartridge.

3. The system as set forth in claim 2, wherein said coil circumscribes said pen point.

4. The system as set forth in claim 1, wherein said pen cartridge comprises a ballpoint pen.

5. The system as set forth in claim 1, including a switch means mounted in said pen cartridge housing adjacent said signal amplifying means actuated by said pen cartridge for providing an electrical indication that said pen cartridge is in operative contact with said writing table.

6. The system as set forth in claim 1, wherein said electrostatic field pick up element comprises said pen point.

7. The system as set forth in claim 1 wherein said pen point and said electrostatic field sensing element are capacitively coupled.

8. The system as set forth in claim 7, including an electrical shield disposed within said housing intermediate the extremity of said pen point and said electrostatic field sensing element for reducing stray capacitance about said electrostatic field sensing element.

9. The system as set forth in claim 8 wherein said electrostatic field sensing element is positioned within said housing to permit axial movement of said pen point without affecting the capacitive coupling between said pen point and said electrostatic field sensing element.

10. The system as set forth in claim 8 wherein said shield is an inverted hollow truncated cone and circumscribes said pen point.

* * * * *